United States Patent
Wang et al.

(10) Patent No.: US 11,691,690 B2
(45) Date of Patent: Jul. 4, 2023

(54) HANDLEBAR FOLDABLE MECHANISM AND TOOL FOR RIDING INSTEAD OF WALK

(71) Applicant: Ninebot (Changzhou) Tech Co., Ltd., Jiangsu (CN)

(72) Inventors: Dengwei Wang, Jiangsu (CN); Huocheng Wei, Jiangsu (CN); Qiang Tan, Jiangsu (CN)

(73) Assignee: Ninebot (Changzhou) Tech Co., Ltd., Jiangsu (CN)

( * ) Notice: Subject to any disclaimer, the term of this patent is extended or adjusted under 35 U.S.C. 154(b) by 49 days.

(21) Appl. No.: 17/389,520

(22) Filed: Jul. 30, 2021

(65) Prior Publication Data
US 2022/0033029 A1    Feb. 3, 2022

(30) Foreign Application Priority Data
Aug. 3, 2020 (CN) .......................... 202021589808.5

(51) Int. Cl.
*B62K 21/16* (2006.01)
*B62K 15/00* (2006.01)

(52) U.S. Cl.
CPC ............ *B62K 15/006* (2013.01); *B62K 21/16* (2013.01); *B62K 2202/00* (2013.01)

(58) Field of Classification Search
CPC .................................................... B62K 21/16
See application file for complete search history.

(56) References Cited

U.S. PATENT DOCUMENTS

| 9,533,730 B2 | 1/2017 | Yu et al. |
| 10,046,825 B1 | 8/2018 | Chen |

FOREIGN PATENT DOCUMENTS

| CN | 201049714 Y | * | 4/2008 | |
| CN | 203419223 U | | 2/2014 | |
| CN | 207791010 U | | 8/2018 | |
| CN | 110884604 A | | 3/2020 | |
| CN | 111874148 A | | 11/2020 | |
| CN | 110758622 B | * | 12/2020 | ........... B62K 15/006 |
| CN | 110884604 B | * | 6/2021 | ............. B62J 11/00 |
| CN | 214689962 U | * | 11/2021 | |

OTHER PUBLICATIONS

Extended European Search Report dated Dec. 14, 2021 for Application No. 21188513.2, 8 pages.

* cited by examiner

*Primary Examiner* — Minnah L Seoh
*Assistant Examiner* — Hosam Shabara
(74) *Attorney, Agent, or Firm* — Frost Brown Todd LLP (57) ABSTRACT

A handlebar foldable mechanism and a tool for riding instead of walk are provided. The handlebar foldable mechanism includes a base, a stem, a first locking assembly, a lever and a second locking assembly. The base is provided with a first snapping groove, the stem is connected to the base and is pivotable between an unfolded position and a folded position, the first locking assembly is pivotably connected to the stem and is configured to be engaged with the first snapping groove when the stem is pivoted from the folded position to the unfolded position, the lever is pivotably connected with the base, the second locking assembly is mounted to the lever, and the second locking assembly is configured to be connected to at least one of the base and the stem when the stem is at the unfolded position.

18 Claims, 6 Drawing Sheets

HANDLEBAR FOLDABLE MECHANISM AND TOOL FOR RIDING INSTEAD OF WALK

CROSS-REFERENCE TO RELATED APPLICATION

This application claims the benefit of priority to Chinese patent Application No. 202021589808.5, filed on Aug. 3, 2020, the content of which is incorporated herein by reference in its entirety.

TECHNICAL FIELD

The present disclosure relates to a field of electrical scooters, and more particularly, to a handlebar foldable mechanism and a tool for riding instead of walk.

BACKGROUND

As for a tool for riding instead of walk such as a scooter, a handlebar and a scooter body are generally arranged to be foldable relative to each other. However, in the related art, the handlebar needs to be locked manually and cannot be locked automatically when the handlebar and the car body are unfolded. As a result, operations become complicated, and the handlebar has a risk of getting loosened easily by accident after being locked manually, leading to low safety.

SUMMARY

Embodiments of a first aspect of the present disclosure propose a handlebar foldable mechanism.

Embodiments of a second aspect of the present disclosure further propose a tool for riding instead of walk.

The handlebar foldable mechanism according to the embodiments of the first aspect of the present disclosure includes a base, a stem, a first locking assembly, a lever and a second locking assembly. The base is provided with a first snapping groove, the stem is connected to the base and is pivotable between an unfolded position and a folded position, the first locking assembly is pivotably connected to the stem and is configured to be engaged with the first snapping groove when the stem is pivoted from the folded position to the unfolded position, the lever is pivotably connected with the base, the second locking assembly is mounted to the lever, and the second locking assembly is configured to be connected to at least one of the base and the stem when the stem is at the unfolded position.

The tool for riding instead of walk according to the embodiments of the second aspect of the present disclosure includes a handlebar foldable mechanism. The handlebar foldable mechanism according to the embodiments of the present disclosure includes a base, a stem, a first locking assembly, a lever and a second locking assembly. The base is provided with a first snapping groove, the stem is connected to the base and is pivotable between an unfolded position and a folded position, the first locking assembly is pivotably connected to the stem and is configured to be engaged with the first snapping groove when the stem is pivoted from the folded position to the unfolded position, the lever is pivotably connected with the base, the second locking assembly is mounted to the lever, and the second locking assembly is configured to be connected to at least one of the base and the stem when the stem is at the unfolded position.

It is to be understood that both the foregoing general description and the following detailed description are illustrative and explanatory only and are not restrictive of the present disclosure, as claimed.

DETAILED DESCRIPTION

Embodiments of the present disclosure will be described in detail below, with examples of the embodiments illustrated in the accompanying drawings. The embodiments to be described with reference to the accompanying drawings are exemplary and aim to give explanations over the present disclosure, but should not be deemed to limit the present disclosure.

A handlebar foldable mechanism 100 according to embodiments of the present disclosure will be described in the following with reference to FIG. 1 to FIG. 10.

As shown in FIG. 1 to FIG. 10, the handlebar foldable mechanism 100 according to the embodiments of the present disclosure includes a base 1, a stem 2, a first locking assembly 5, a lever 4 and a second locking assembly 6. The base 1 is provided with a first snapping groove 11, the stem 2 is connected to the base 1 and is pivotable relative to the base 1 between an unfolded position and a folded position. The first locking assembly 5 is pivotably connected to the stem 2, and the first locking assembly 5 is engaged with the first snapping groove 11 when the stem 2 is pivoted from the folded position to the unfolded position.

Figure 1:
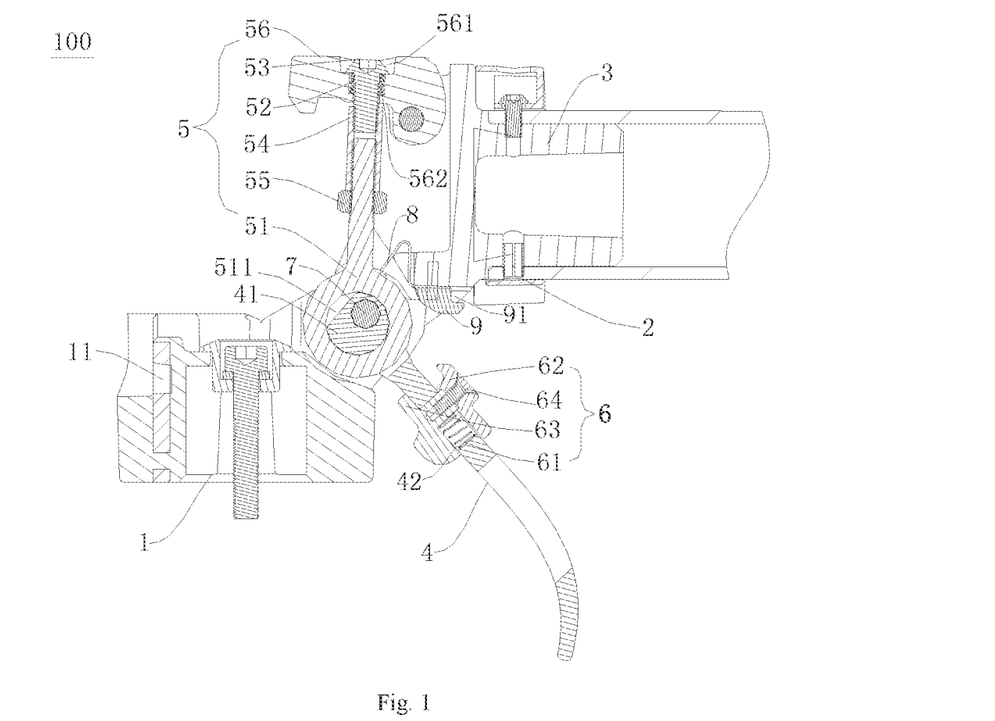
FIG. 1 is a schematic view of a handlebar foldable mechanism in a folded state according to an embodiment of the present disclosure, in which a stem is at a folded position.
Figure 2:
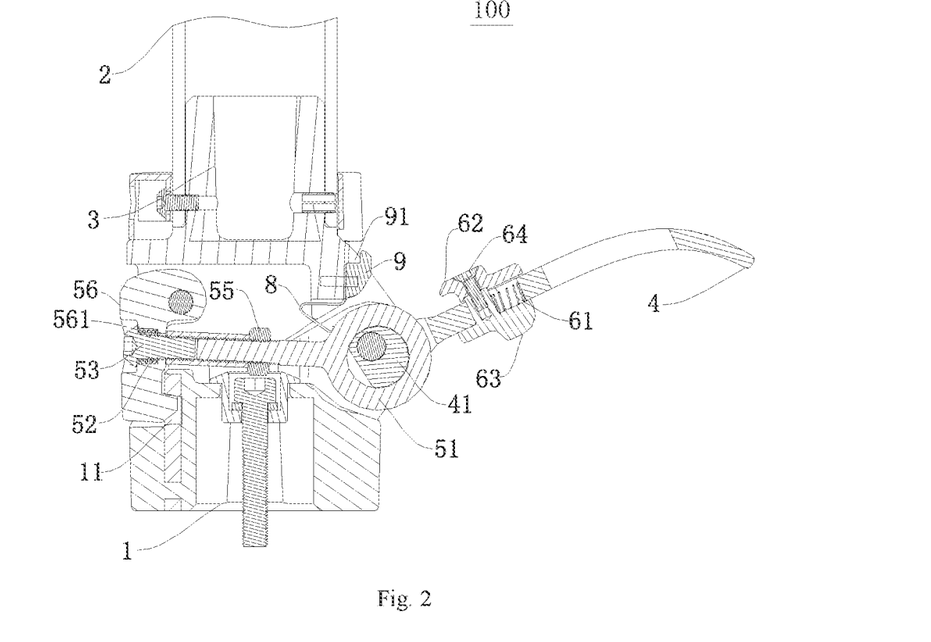
FIG. 2 is a schematic view of a handlebar foldable mechanism in an unfolded state according to an embodiment of the present disclosure, in which a stem is at an unfolded position and a first locking assembly is not locked by a lever.
Figure 3:
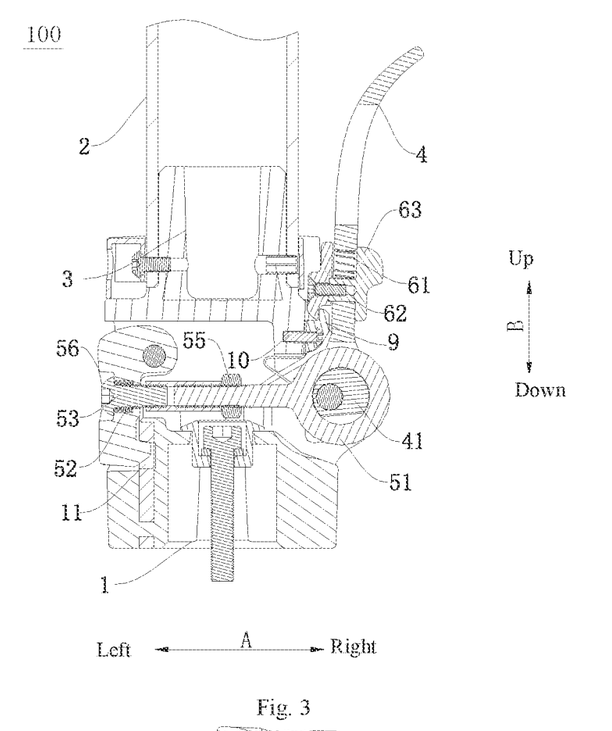
FIG. 3 is a schematic view of a handlebar foldable mechanism in an unfolded state according to an embodiment of the present disclosure, in which a stem is at an unfolded position and a first locking assembly is locked by a lever.

As shown in FIG. 1 to FIG. 3, the stem 2 is erect at the unfolded position, a right portion of a lower end of the stem 2 is pivotably connected to a right portion of an upper end of the base 1, the first locking assembly 5 is pivotably connected to a left portion of the lower end of the stem 2, and the first snapping groove 11 with a leftward opening is formed in a left side of the base 1. When the stem 2 is at the unfolded position, the first locking assembly 5 can be automatically engaged with the first snapping groove 11, so that relative fixation of the stem 2 and the base 1 at the unfolded position is realized.

The lever 4 is pivotably connected to the base 1 and configured to lock the first locking assembly 5 in the first snapping groove 11 and to separate the first locking assembly 5 from the first snapping groove 11. The second locking assembly 6 is mounted to the lever 4, and the second locking assembly 5 can be connected to at least one of the base 1 and the stem 2 when the stem 2 is at the unfolded position, so that the lever 4 can be locked at the unfolded position and thus the pivoting of the lever 4 can be prevented.

As shown in FIG. 2 and FIG. 3, the lever 4 can be rotated along a direction relative to the base 1, so that the first locking assembly 5 can be further engaged into the first snapping groove 11. The lever 4 can also be rotated along an opposite direction relative to the base 1, so that the first locking assembly 5 can be moved away from the first snapping groove 11 and can finally be separated from the first snapping groove 11. After the first locking assembly 5 is further engaged into the first snapping groove 11, the second locking assembly 6 can be connected to the base 1, or can be connected to the stem 2, or can be connected to the base 1 and the stem 2 at the same time, so that the lever 4 can be locked, and the lever 4 is prevented from being rotated by accident, which otherwise will cause the first locking assembly 5 to be separated from the first snapping groove 11.

According to the handlebar foldable mechanism 100 provided by the embodiments of the present disclosure, the first locking assembly 5 can be automatically engaged into the first snapping groove 11 of the base 1 when the stem 2 is pivoted from the folded position to the unfolded position, so that the stem 2 can be locked, the relative fixation of the stem 2 and the base 1 in an unfolded state can be realized and the stem 2 does not need to be locked by manual operations. Therefore, the stem 2 can be locked conveniently. In addition, when the stem 2 is pivoted to the unfolded position, the lever 4 can be pivoted relative to the base 1, so that the first locking assembly 5 can be further engaged into the first snapping groove 11 and the stem 2 can be further locked. The lever 4 can be locked by the second locking assembly 6, so that the lever 4 is prevented from being pivoted by accident and thus the first locking assembly 5 can be limited. In this way, the first locking assembly 5 can be effectively prevented from being separated from the first snapping groove 11 by accident, which otherwise will lead to folding of the stem 2, so that safety is enhanced.

For easy understanding, an arrow A in FIG. 3 indicates a left-right direction of the handlebar foldable mechanism 100, and an arrow B in FIG. 3 indicates an up-down direction of the handlebar foldable mechanism 100.

In some embodiments, the first locking assembly 5 includes a tensioning rod 51 and a first snap 56, the first snap 56 is connected to the tensioning rod 51, the first snap 56 is pivotably connected to the stem 2, and the tensioning rod 51 is pivotably connected to the lever 4.

As shown in FIG. 2, an upper section of the first snap 56 is pivotably connected to the lower end of the stem 2 by a second pivot, a middle section of the first snap 56 is connected to the tensioning rod 51, and a lower section of the first snap 56 is configured to be engaged with the first snapping groove 11 having the leftward opening. At the unfolded position, when the lever 4 is rotated anticlockwise relative to the base 1, the tensioning rod 51 can be driven to move rightwards and thus the first snap 56 can be driven to rotate anticlockwise relative to the stem 2. Therefore, the lower section of the first snap 56 is further engaged into the first snapping groove 11. In this way, the stable fit between the first snap 56 and the first snapping groove 11 is further ensured, and locking effects between the stem 2 and the base 1 are better.

In some embodiments, the tensioning rod 51 is provided with a cam cavity 511, a cam 41 is arranged to a first end of the lever 4, the cam 41 is pivotably connected to the base 1 by a first pivot 7, the cam 41 is arranged eccentrically relative to a central axis of the first pivot 7, and the cam 41 is fitted in the cam cavity 511.

Figure 9:
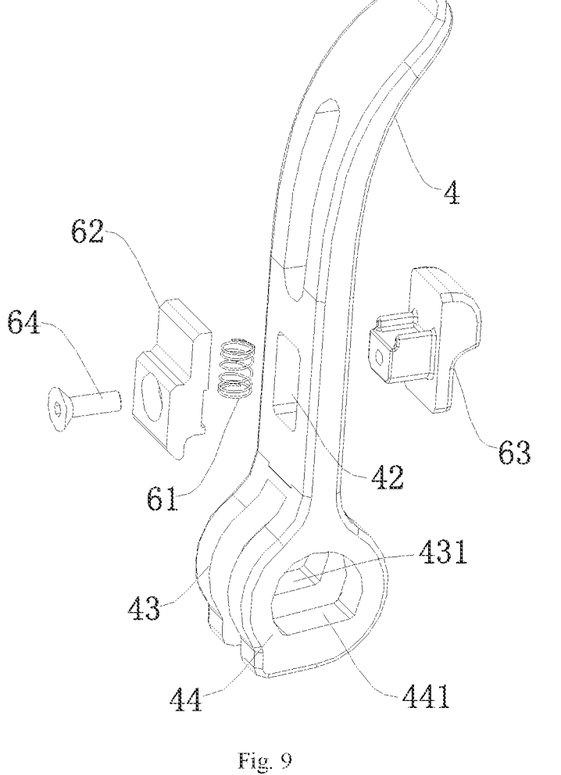
FIG. 9 is an exploded view of a second locking assembly and a lever of a handlebar foldable mechanism according to yet another embodiment of the present disclosure.

As shown in FIG. 3 and FIG. 9, the stem 2, the base 1 and the cam 41 are pivotably connected with one another by the first pivot 7, a first connecting arm 43 and a second connecting arm 44 are arranged to a lower end of the lever 4, the first connecting arm 43 and the second connecting arm 44 are spaced in a width direction of the lever 4, and the first connecting arm 43 and the second connecting arm 44 are provided with a first insertion hole 431 and a second insertion hole 441 into which the cam 41 is configured to be inserted and fitted respectively. A right end of the tensioning rod 51 is inserted between the first connecting arm 43 and the second connecting arm 44, and the cam 41 passes through the first insertion hole 431, the cam cavity 511 and the second insertion hole 441 to complete the pivotable connection of the tensioning rod 51 and the lever 4. The lever 4 is pivoted on the first pivot 7 by the cam 41, and the cam 41 is arranged eccentrically relative to the central axis of the first pivot 7.

In this way, when the lever 4 is rotated anticlockwise relative to the stem 2 (rotating towards the stem 2), a relative rotation happens between the lever 4 and the tensioning rod 51, the tensioning rod 51 moves roughly rightwards under the fit of the cam 41 and the cam cavity 511, and thus the lower section of the first snap 56 is pulled to move roughly rightwards together, so that the lower section of the first snap 56 is further engaged into the first snapping groove 11. Vice versa, when the lever 4 is rotated clockwise relative to the stem 2 (rotating away from the stem 2), the tensioning rod 51 moves roughly leftwards under the fit of the cam 41 and the cam cavity 511, and thus the lower section of the first snap 56 is pushed to move roughly leftwards together, so that the lower section of the first snap 56 is separated from the first snapping groove 11. In this way, the lever 4 can control the first snap 56 accurately and flexibly.

In some embodiments, the first locking assembly 5 further includes a threaded sleeve 54 and a first bolt 53, a second end of the tensioning rod 51 is provided with external threads, the second end of the tensioning rod 51 is threadedly fitted in the threaded sleeve 54, the first snap 56 is provided with a snap through hole 561, and the first bolt 53 passes through the snap through hole 561 to be threadedly fitted with the threaded sleeve 54.

As shown in FIG. 2, the first bolt 53 passes through the snap through hole 561 and is threadedly fitted in a left end of the threaded sleeve 54, a nut of the first bolt 53 abuts against a left side face of the first snap 56, and a left end of the tensioning rod 51 is threadedly fitted in a right end of the threaded sleeve 54. In this way, by adjusting a length of a part of the first bolt 53 screwed into the threaded sleeve 54 and/or adjusting a length of a part of the tensioning rod 51 screwed into the threaded sleeve 54, a distance between the first snap 56 and the first pivot 7 can be adjusted, and thus the degree of locking between the first snap 56 and the first snapping groove 11 can thus be adjusted.

In some embodiments, the first locking assembly 5 further includes a first spring 52, a step 562 is arranged in the snap through hole 561, the first spring 52 is arranged in the snap through hole 561, a first end of the first spring 52 abuts against the first bolt 53, and a second end of the first spring 52 abuts against the step 562 so as to press the first snap 56 towards the threaded sleeve 54.

As shown in FIG. 2, the first spring 52 is fitted over the first bolt 53, a left end of the first spring 52 abuts against the nut of the first bolt 53, a right end of the first spring 52 abuts against the step 562 of the first snap 56, and the first spring 52 keeps pushing the first snap 56 to rotate anticlockwise relative to the stem 2. In a process of the stem 2 being pivoted from the folded position to the unfolded position, the first snap 56 first abuts with the base 1 and then slides relative to the base 1, so that the first snap 56 is pushed to rotate clockwise relative to the stem 2, till that the first snap 56 is pushed by the first spring 52 to enter the first snapping groove 11 when the lower section of the first snap 56 faces the first snapping groove 11. In this way, when the stem 2 is pivoted to the unfolded position, the first snap 56 is automatically engaged into the first snapping groove 11 under the action of the first spring 52, so that manual operations are not needed, and the stem 2 can be locked more conveniently. In addition, under the action of the first spring 52, the first snap 56 generally will not be moved relative to the base 1 after being engaged into the first snapping groove 11 and thus noise is not generated.

In some embodiments, the first locking assembly 5 further includes an adjusting nut 55, the adjusting nut 55 is threadedly fitted with the tensioning rod 51 and located on a side, away from the first snap 56, of the threaded sleeve 54. As shown in FIG. 2, the adjusting nut 55 abuts against a right end face of the threaded sleeve 54, so that the left end of the tensioning rod 51 is effectively prevented from being screwed out of the threaded sleeve 54 by accident, which otherwise will cause the engagement between the first snap 56 and the first snapping groove 11 to be loosen or even cause separation between the first snap 56 and the first snapping groove 11.

In some embodiments, the second locking assembly 6 includes a second snap 62 and a second spring 61, the lever 4 is provided with a slot 42, the stem 2 is provided with a second snapping groove 91, the second snap 62 is mounted to the lever 4 and movable along the slot 42 to be engaged into and separated from the second snapping groove 91, the second spring 61 is arranged in the slot 42, a first end of the second spring 61 abuts against a wall of the slot 42, and a second end of the second spring 61 abuts against the second snap 62, so that the second snap 62 is pressed in a direction of being engaged into the second snapping groove 91.

As shown in FIG. 3, a length direction of the slot 42 is roughly consistent with a length direction of the lever 4, and the second snap 62 is slidably fitted to an inner side (a side facing the stem 2) of the lever 4. A part of the second snap 62 is movably received in the slot 42. The second snapping groove 91 in the stem 2 has an upward opening, the first end of the second spring 61 abuts against a downward end wall of the slot 42, the second end of the second spring 61 abuts against an upper side face of the second snap 62, and the second spring 61 keeps pushing the second snap 62 to move downwards. At the unfolded position, when the lever 4 is rotated anticlockwise relative to the stem 2 to make the first snap 56 continue moving to be engaged into the first snapping groove 11, the second snap 62 first abuts with the stem 2 and then the second snap 62 slides relative to the stem 2, so that the second snap 62 is pushed to move upwards, till that the second snap 62 faces the second snapping groove 91, and the second snap 62 is pushed by the second spring 61 to enter the second snapping groove 91. In this way, the second snap 62 can be automatically engaged into the second snapping groove 91 under the action of the second spring 61, and the lever 4 can be locked without manual operations.

It should be noted that after the second snap 62 and the second snapping groove 91 are engaged, the lever 4 is roughly erect. At this moment, the cam mechanism is located at a dead point position. Even if the second snap 62 is separated from the second snapping groove 91 by mistake, the lever 4 will not rotate anticlockwise relative to the stem 2 without being subject to an external force, so that the risk that the first snap 56 is separated out of the first snapping groove 11 by accident can be further reduced.

In some embodiments, the second locking assembly 6 further includes a slide knob 63, the slot 42 is a through slot, the second snap 62 is arranged on a first side of the slot 42, the slide knob 63 is arranged on a second side of the slot 42 and opposite to the second snap 62, and the first snap 56 is connected to the slide knob 63.

As shown in FIG. 3, the slide knob 63 is located on an outer side of the lever 4 (a side, facing away from the stem 2, of the lever 4) and a part of the slide knob 63 passes through the slot 42 and is connected to the second snap 62 by a second bolt 64. At this moment, the second end of the second spring 61 abuts against an upper side face of the slide knob 63. In this way, after the second snap 62 is engaged into the second snapping groove 91, by pushing the slide knob 63 upwards, the second snap 62 can be driven to be separated from the second snapping groove 91, so that the locking of the lever 4 can be relieved.

In some embodiments, the slide knob 63 includes a first abutting part 66, the first locking assembly 5 includes a first limiting part 512, and the first limiting part 512 is engaged with the first abutting part 66 when the lever 4 is pivoted to a preset position along a direction running away from the stem 2, so that the lever 4 is prevented from continuing pivoting from the preset position along the direction running away from the stem 2.

Figure 4:
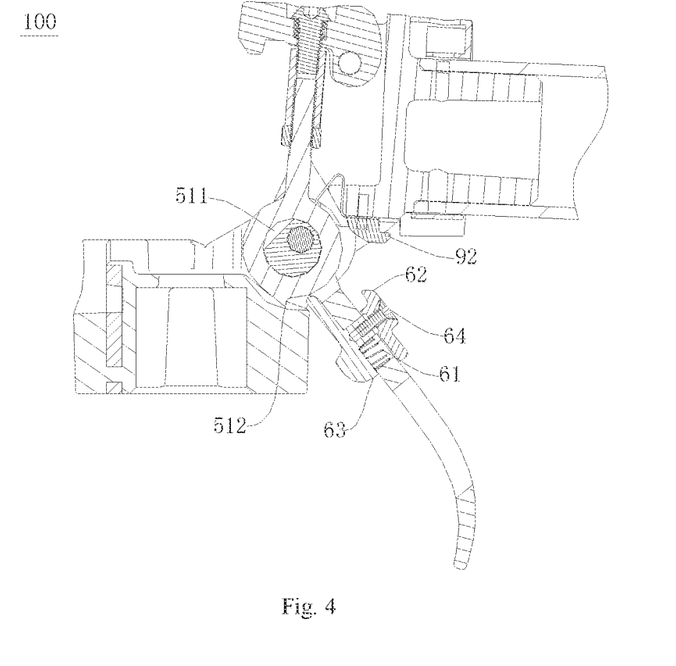
FIG. 4 is a schematic view of a handlebar foldable mechanism in a folded state according to another embodiment of the present disclosure, in which a stem is at a folded position.
Figure 5:
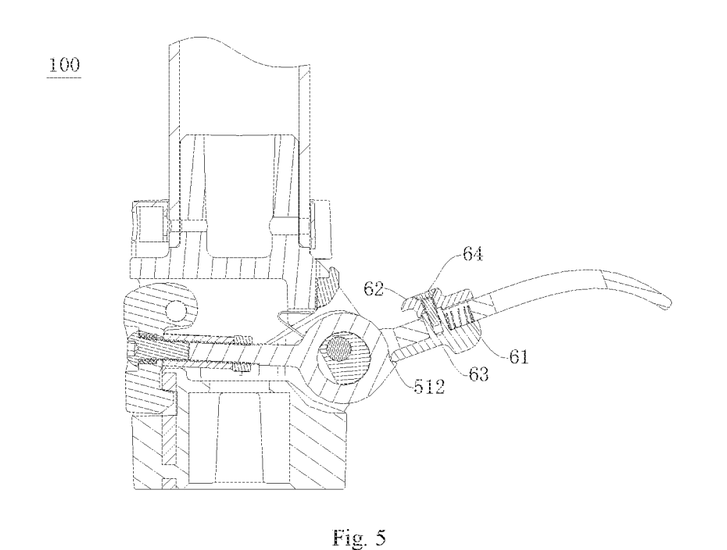
FIG. 5 is a schematic view of a handlebar foldable mechanism in an unfolded state according to another embodiment of the present disclosure, in which a stem is at an unfolded position and a first locking assembly is not locked by a lever.
Figure 6:
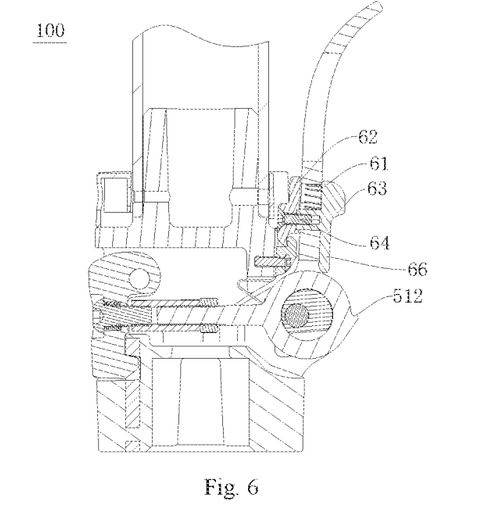
FIG. 6 is a schematic view of a handlebar foldable mechanism in an unfolded state according to another embodiment of the present disclosure, in which a stem is at an unfolded position and a first locking assembly is locked by a lever.

As shown in FIG. 4 to FIG. 6, the first abutting part 66 is arranged on an end, facing the cam 41, of the slide knob 63, and the first limiting part 512 is arranged on the right end of the tensioning rod 51. In a process of the stem 2 being pivoted from the folded position to the unfolded position, the lever 4 first keeps still, an included angle between the stem 2 and the lever 4 increases gradually, and an included angle between the tensioning rod 51 and the lever 4 also increases gradually, so that the distance between the first snap 56 and the first pivot 7 increases gradually, till that the first abutting part 66 is engaged with the first limiting part 512, and the lever 4 cannot be pivoted clockwise relative to the stem 2. Afterwards, when the stem 2 continues pivoting towards the unfolded position, the lever 4 is pivoted together with the stem 2, and the angle between the lever 4 and the stem 2 is kept unchanged. At this moment, the distance between the first snap 56 and the first pivot 7 is kept unchanged. After the stem 2 is pivoted to the unfolded position, the first snap 56 is automatically engaged into the first snapping groove 11. In this way, the case that the first snap 56 cannot be automatically engaged into the first snapping groove 11 when the distance between the first snap 56 and the first pivot 7 is too long or too short at the unfolded position can be avoided.

When the stem 2 needs to be folded, the slide knob 63 is pushed upwards at first, so that the second snap 62 is separated from the second snapping groove 91. The lever 4 is driven to rotate clockwise relative to the stem 2 till the first abutting part 66 is engaged with the first limiting part 512. At this moment, the first snap 56 still keeps engaged with the first snapping groove 11. Afterwards, the slide knob 63 is pushed upwards to make the first abutting part 66 get separated from the first limiting part 512. The lever 4 is driven to continue rotating clockwise relative to the stem 2 till the first snap 56 is separated out of the first snapping groove 11, and thus the stem 2 can be folded. In this way, through the engagement of the first abutting part 66 and the first limiting part 512, the stem 2 is prevented from being folded forthwith after rotation of the lever 4, and harm brought by the sudden folding of the stem 2 to human bodies can be avoided.

It should be noted that the preset position at which the lever 4 is located refers to a position when the distance between the first snap 56 and the first pivot 7 is a preset value. This position may be determined by taking the stem 2 as a reference, that is, a position passed by the lever 4 when pivoted together with the stem 2 can be set as the preset position.

In some embodiments, the slide knob 63 includes a second abutting part 65, the base 1 is provided a second limiting part 12, and the second limiting part 12 is engaged with the second abutting part 65 when the lever 4 is pivoted to a preset position along the direction running away from the stem 2, so that the lever 4 is prevented from continuing pivoting from the preset position along the direction running away from the stem 2.

Figure 7:
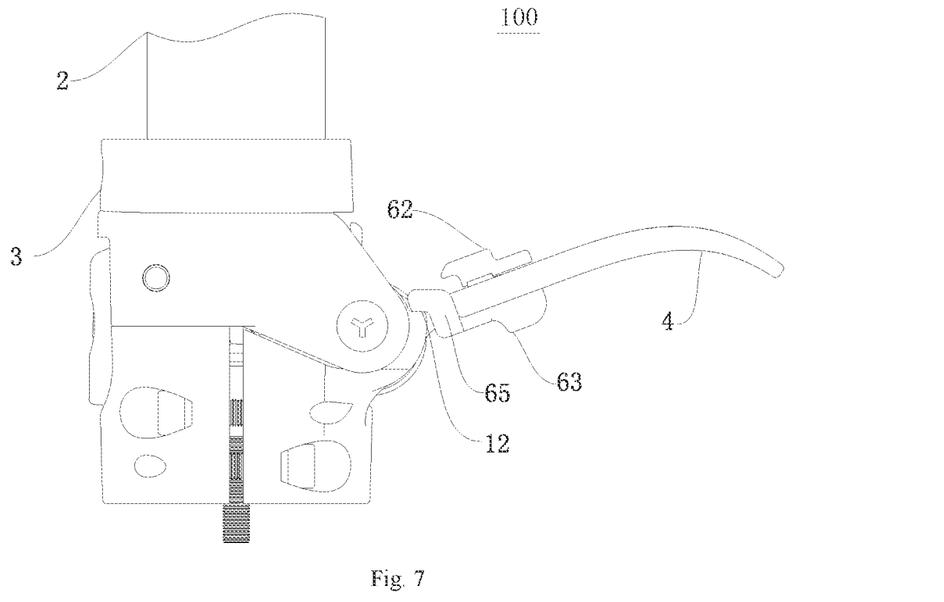
FIG. 7 is a schematic view of a handlebar foldable mechanism in an unfolded state according to yet another embodiment of the present disclosure, in which a stem is at an unfolded position and a first locking assembly is not locked by a lever.
Figure 10:
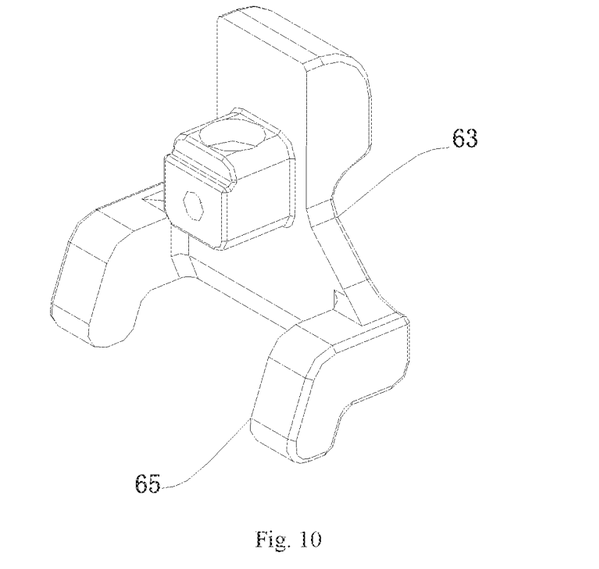
FIG. 10 is a schematic view of a slide knob of a handlebar foldable mechanism according to yet another embodiment of the present disclosure.

As shown in FIG. 7 and FIG. 10, the second abutting part 65 is arranged on an end, facing the cam 41, of the slide knob 63 and has a roughly fork-shaped structure, and the second abutting part 65 can limit the lever 4 at the preset position by being engaged with the second limiting part 12 on the base 1. Specifically, effects of engagement of the second abutting part 65 and the second limiting part 12 are the same with those of engagement of the first abutting part 66 and the first limiting part 512, which will not be repeated here.

In some embodiments, the handlebar foldable mechanism 100 further includes a third snap 9, the third snap 9 is mounted to the stem 2, and the second snapping groove 91 is formed in the third snap 9.

As shown in FIG. 1 to FIG. 6, the third snap 9 is fixed to a rightward wall face of the stem 2 by a third bolt 10, a protrusion 92 extends from a top face of the third snap 9, the protrusion 92 and the stem 2 are spaced in the left-right direction, and the third snap 9 defines the second snapping groove 91 with the upward opening between the protrusion 92 and the stem 2. An outer wall face of the protrusion 92 is a slope which can slide relative to the second snap 62 and push the second snap 62 to slide upwards, so as to sure that the second snap 62 can be finally engaged into the second snapping groove 91.

In some embodiments, the handlebar foldable mechanism 100 further includes a half-round head screw 110, the half-round head screw 110 is mounted to the stem 2 and a half-round head of the half-round head screw 110 is spaced from the stem 2, and the second snapping groove 91 is formed between the half-round head of the half-round head screw 110 and the stem 2. In this way, an outer end face of the half-round head of the half-round head screw 110 can also slide relative to the second snap 62 and push the second snap 62 to slide upwards, so as to sure that the second snap 62 can be finally engaged into the second snapping groove 91.

In some embodiments, the handlebar foldable mechanism 100 further includes a limiting elastic member, a first end of the limiting elastic member is connected to the stem 2, and a second end of the limiting elastic member abuts against the lever 4 when the lever 4 is pivoted to the preset position along the direction running away from the stem 2, so that the lever 4 is prevented from continuing pivoting from the preset position along the direction running away from the stem 2.

As shown in FIG. 1 to FIG. 6, the limiting elastic member is a leaf spring 8, one end of the leaf spring 8 is fixed between the stem 2 and the second snap 9 by the third bolt 10, and the other end of the leaf spring 8 is protruded beyond the lower end of the stem 2. The lower end of the lever 4 is provided with a limiting face. When the relative pivoting happens between the lever 4 and the stem 2, the other end of the leaf spring 8 can abut against the limiting face of the lever 4 so as to prevent clockwise rotation of the lever 4 relative to the stem 2 and thus to limit the lever 4 at the preset position. When the stem 2 needs to be folded, what should be done is to press the lever 4 hard to allow the lever 4 to continue rotating clockwise relative to the stem 2, so that the first snap 56 can be driven to be separated out of the first snapping groove 11, thus completing the folding of the stem 2. In this way, by limiting the lever 4 with the leaf spring 8, the stem 2 can be locked automatically when pivoted to the unfolded position, and the harm brought by the sudden folding of the stem 2 to human bodies w % ben the stem 2 needs to be folded can be avoided.

It should be noted that the limiting elastic member may also be any one of a torsional spring, a compressed spring or a tension spring, as long as it can abut against the lever 4 to limit the lever 4 at the preset position.

In some embodiments, the handlebar foldable mechanism 100 further includes a lower connector 3, the lower connector 3 is fixed to the lower end of the stem 2, the stem 2 is pivotably connected to the base 1 by the lower connector 3, and the stem 2 is pivotably connected to the first locking assembly 5 by the lower connector 3.

As shown in FIG. 1 to FIG. 6, the lower connector 3 is fitted in the lower end of the stem 2 and they are fixed by a bolt. Both the first pivot 7 and the second pivot are fitted to the lower connector 3, and the first snap 56 is pivotably connected to the lower connector 3 by the second pivot. Both the cam 41 of the lever 4 and the base 1 are pivotably connected to the lower connector 3 by the first pivot 7. In some embodiments, the second snap 62 is also fixed to the lower connector 3 by the third bolt 10 so as to fix the second snap 62 to the stem 2.

Figure 8:
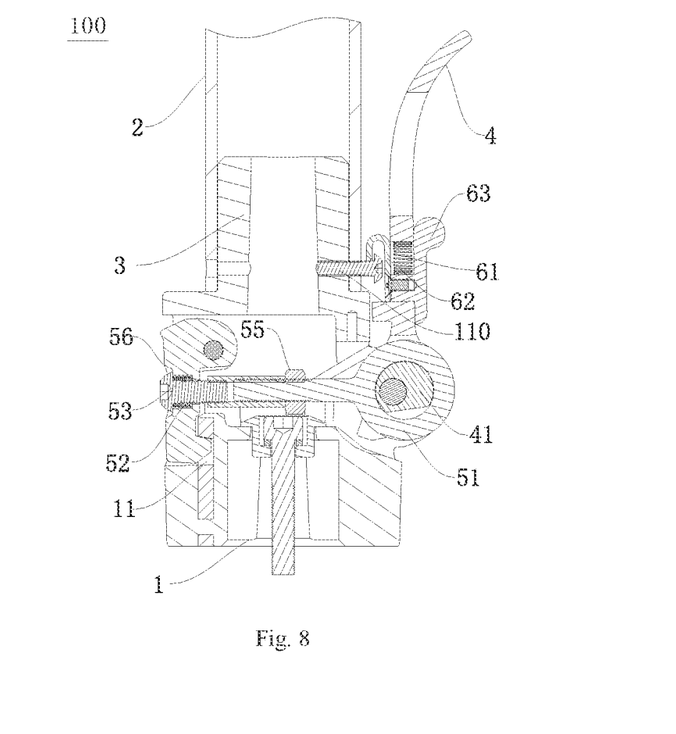
FIG. 8 is a schematic view of a handlebar foldable mechanism in an unfolded state according to yet another embodiment of the present disclosure, in which a stem is at an unfolded position and a first locking assembly is locked by a lever.

It should be noted that, as shown in FIG. 8, the lower connector 3 can also be fixed with the stem 2 by the half-round head screw 11. In this case, the half-round head screw 11 forms the second snapping groove 91, and also connects the lower connector 3 with the stem 2, so that the structure of the handlebar foldable mechanism 100 is further simplified.

The handlebar foldable mechanism 100 according to a specific example of the embodiments of the present disclosure will be described in the following with reference to FIG. 1 to FIG. 3.

As shown in FIG. 1 to FIG. 3, the handlebar foldable mechanism 100 according to the embodiment of the present disclosure includes a base 1, a stem 2, a lower connector 3, a first locking assembly 5, a lever 4, a second locking assembly 6, a third snap 9 and a leaf spring 8.

The base 1 is provided with a first snapping groove 11, the lower connector 3 is fitted in a lower end of the stem 2 and is fixed by a bolt, and the lower connector 3, the base 1 and the lever 4 are pivotably connected with one another by a first pivot 7.

The first locking assembly 5 includes a first snap 56, a first spring 52, a first bolt 53, a threaded sleeve 54, an adjusting nut 55 and a tensioning rod 51, the first snap 56 is pivotably connected by a second pivot, the first snap 56 is provided with a snap through hole 561, and the first bolt 53 passes through the first spring 52 and the snap through hole 561 in sequence to be fitted with the threaded sleeve 54. The tensioning rod 51 is threadedly fitted with an adjusting bolt and the threaded sleeve 54 in sequence, and the adjusting bolt abuts against a right end face of the threaded sleeve 54. When the stem is at the unfolded position, the first snap 56 is engaged with the first snapping groove 11.

The lower end of the lever 4 is provided with a first connecting arm 43 and a second connecting arm 44 spaced in a width direction, as well as a cam 41 inserted and fitted in a first insertion hole 431 in the first connecting arm 43 and a second insertion hole 441 in the second connecting arm 44. A cam cavity 511 is formed in the right end of the tensioning rod 51, the right end of the tensioning rod 51 is arranged between the first connecting arm 43 and the second connecting arm 44. Afterwards, the cam 41 passes through the first insertion hole 431, the cam cavity 511 and the second insertion hole 441, so as to rotatably connect the tensioning rod 51 with the lever 4.

The second locking assembly 6 includes a second snap 62, a slide knob 63 and a second spring 61, a slot 42 is formed in the lever 4, the slot 42 is a through slot, the second snap 62 is located on a side, facing the stem 2, of the lever 4, the slide knob 63 is located on a side, facing away from the stem 2, of the lever 4, and a part of the slide knob 63 extends into the slot 42 and is connected to the second snap 62 by a second bolt 64. A first end of the second spring 61 abuts against a downward end wall of the slot 42, and a second end of the second spring 61 abuts against the slide knob 63.

The third snap 9 is fixed on the lower connector 3 by a third bolt 10, the third snap 9 forms a second snapping groove 91 with an upward opening, and the second snap 62 can be engaged with the second snapping groove 91.

The upper end of the leaf spring 8 is fixed between the lower connector 3 and the third snap 9 by the third bolt 10, and the lower end of the lever 4 is provided with a limiting face. When the handlebar foldable mechanism 100 is in an unfolded state, the stem 2 is at the unfolded position and the first locking assembly 5 is not locked by the lever 4, the lower face of the leaf spring 8 abuts against the limiting face and the lever 4 cannot rotate clockwise relative to the stem 2 without being subject to an external force.

In the following, an operation process of the handlebar foldable mechanism 100 according to the specific example, which is shown in FIG. 1 to FIG. 3, of the embodiments of the present disclosure, switching from the folded state to the unfolded state is briefly described.

At first, an operator rotates the stem 2 anticlockwise relative to the base 1, the stem 2 drives the tensioning rod 51 to rotate, the lever 4 stands still, the tensioning rod 51 is rotated relative to the lever 4, and the distance between the first snap 56 and the first pivot 7 gradually increases. Till the leaf spring 8 under the stem 2 abuts against the limiting face of the lever 4, the lever 4 is rotated together with the stem 2. At this moment, the distance between the first snap 56 and the first pivot 7 is kept unchanged. As the stem 2 and the lever 4 continue rotating, the first snap 56 abuts against the base 1 and slides relative to the base 1, and the first snap 56 is rotated clockwise relative to the lower connector 3, so that the stem 2 can smoothly arrive at the unfolded position. After the stem 2 arrives at the unfolded position, the first snap 56 just faces the first snapping groove 11, and the first spring 52 allows the first snap 56 to be engaged into the first snapping groove 11, so that the automatic locking of the stem 2 and the base 1 is completed.

Afterwards, the lever 4 is driven to rotate anticlockwise relative to the stem 2 and then drives the tensioning rod 51 and the first snap 56 to move roughly rightwards, so that the first snap 56 is further pressed into the first snapping groove 11. Before the lever 4 is going to complete the locking of the first locking assembly 5, the second snap 62 on the lever 4 abuts against and slides relative to the third snap 9 on the lower connector 3, and the third snap 9 pushes the second snap 62 to move upwards. When the lever 4 completes the locking of the first locking assembly 5, the second snap 62 just faces the second snapping groove 91, the second spring 61 pushes the second snap 62 into the second snapping groove 91, and the lever 4 is locked. In this way, a whole unfolding operation is completed.

Figure 11:
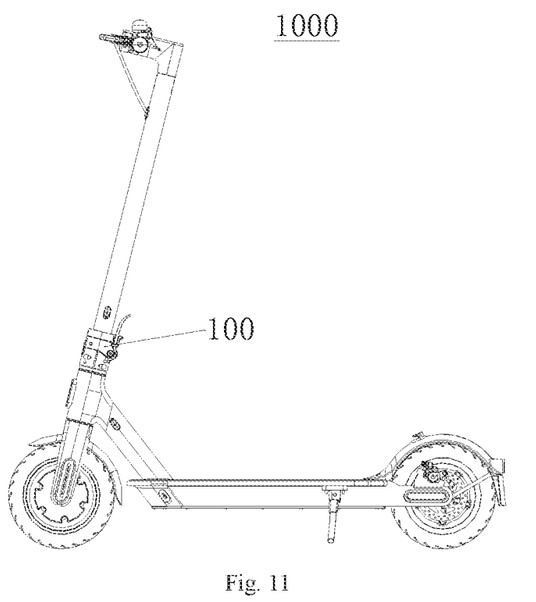
FIG. 11 is a schematic view of a tool for riding instead of walk according to an embodiment of the present disclosure.

A tool for riding instead of walk 1000 according to embodiments of a second aspect of the present disclosure includes the handlebar foldable mechanism 100 provided by any of the above embodiments, as illustrated in FIG. 11.

According to the tool for riding instead of walk 1000 provided by the embodiments of the present disclosure, the stem 2 can be automatically locked by the first snap 56 when switched from the folded position to the unfolded position. At least two steps of operations are needed to relieve the locking between the stem 2 and the base 1, so that safety is enhanced. In the end, w % ben the stem 2 is switched from the unfolded position to the folded position, the stem 2 is prevented from falling down suddenly, so as not to bring harm to human bodies.

In some embodiments, the tool for riding instead of walk 1000 is a scooter. Of course, the present disclosure is not limited to this. For example, it may also be a bicycle, a balance car, etc.

It should be understood that in the description of the present disclosure, terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the explanation of the present disclosure, the meaning of "a plurality of" is at least two, such as two, three, etc. unless otherwise clearly specified.

In the present disclosure, unless otherwise specifically regulated and defined, terms such as "mounting", "connected", "connecting", "fixation" and the like shall be understood in broad sense, and for example, may refer to fixed connection or detachable connection or integral connection, may refer to mechanical connection or electrical connection or communication, and may refer to direct connection or indirect connection through an intermediate medium or inner communication of two elements or interaction relationship of two elements, unless otherwise clearly specified. For those ordinary skilled in the art, the specific meanings of the above terms in the present disclosure may be understood according to concrete conditions.

In the present disclosure, unless otherwise clearly specified and defined, a first feature is "above" or "below" a second feature includes that the first feature and the second feature come into direct contact or the first feature and the second feature come into indirect contact through an intermediary. Moreover, the first feature is "on", "above" and "over" the second feature includes that the first feature is directly above or obliquely above the second feature, or just indicates that the horizontal height of the first feature is higher than that of the second feature. The first feature is "under", "below" and "beneath" the second feature includes that the first feature is directly below or obliquely below the second feature, or just indicates that the horizontal height of the first feature is lower than that of the second feature.

In the present disclosure, terms "one embodiment", "some embodiments", "example", "specific example" or "some examples", etc. means that specific features, structures, materials or characteristics illustrated in combination with the embodiment or example are included in at least one embodiment or example of the present disclosure. In this description, exemplary statements for the above terms do not must aim at the same embodiment or example. Moreover, the described specific features, structures, materials or characteristics can be combined appropriately in any one or more embodiments or examples. In addition, without conflict, those skilled in the art can combine and integrate different embodiments or examples and the features of different embodiments or examples illustrated in this description.

Although the embodiments of the present disclosure have been shown and described above, it will be appreciated that the above embodiments are exemplary and shall not be understood as limitations to the present disclosure. Those ordinary skilled in the art can make changes, amendments, replacements and variations to the above embodiments within the scope of the present disclosure.

What is claimed is:

1. A handlebar foldable mechanism, comprising:
   a base provided with a first snapping groove;
   a stem connected to the base and pivotable between an unfolded position and a folded position;
   a first locking assembly pivotably connected to the stem and configured to be engaged with the first snapping groove when the stem is pivoted from the folded position to the unfolded position;
   a lever pivotably connected with the base by a first pivot; and
   a second locking assembly mounted to the lever, and configured to be connected to at least one of the base and the stem when the stem is at the unfolded position,
   wherein the first locking assembly comprises a tensioning rod and a first snap, the first snap is connected to the tensioning rod, and the tensioning rod is pivotably connected to the lever,
   wherein the first snap is pivotably connected to the stem by a second pivot.

2. The handlebar foldable mechanism according to claim 1, wherein the tensioning rod is provided with a cam cavity, a cam is arranged to a first end of the lever, the cam is pivotably connected to the base by the first pivot and arranged eccentrically relative to a central axis of the first pivot, and the cam is fitted in the cam cavity.

3. The handlebar foldable mechanism according to claim 1, wherein the first locking assembly further comprises a threaded sleeve and a first bolt, an end of the tensioning rod is provided with external threads, the end of the tensioning rod is threadedly fitted in the threaded sleeve, the first snap is provided with a snap through hole, and the first bolt passes through the snap through hole to be threadedly fitted with the threaded sleeve.

4. The handlebar foldable mechanism according to claim 3, wherein the first locking assembly further comprises a first spring, a step is arranged in the snap through hole, the first spring is arranged in the snap through hole, a first end of the first spring abuts against the first bolt, and a second end of the first spring abuts against the step.

5. The handlebar foldable mechanism according to claim 4, wherein the first locking assembly further comprises an adjusting nut, the adjusting nut is threadedly fitted with the tensioning rod and located on a side, away from the first snap, of the threaded sleeve.

6. The handlebar foldable mechanism according to claim 1, wherein the second locking assembly comprises a second snap and a second spring, the lever is provided with a slot, the stem is provided with a second snapping groove, the second snap is mounted to the lever and movable along the slot to be engaged into and separated from the second snapping groove, the second spring is arranged in the slot, a first end of the second spring abuts against a wall of the slot, and a second end of the second spring abuts against the second snap.

7. The handlebar foldable mechanism according to claim 6, wherein the second locking assembly further comprises a slide knob, the slot is a through slot, the second snap is arranged on a first side of the slot, the slide knob is arranged on a second side of the slot and opposite to the second snap, and the first snap is connected to the slide knob.

8. The handlebar foldable mechanism according to claim 7, wherein the slide knob comprises a first abutting part, the first locking assembly comprises a first limiting part, and the first limiting part is configured to be engaged with the first abutting part when the lever is pivoted to a preset position along a direction running away from the stem.

9. The handlebar foldable mechanism according to claim 7, wherein the slide knob comprises a second abutting part, the base is provided a second limiting part, and the second limiting part is configured to be engaged with the second abutting part when the lever is pivoted to a preset position along a direction running away from the stem.

10. The handlebar foldable mechanism according to claim 6, further comprising a third snap, wherein the third snap is mounted to the stem, and the second snapping groove is formed in the third snap.

11. The handlebar foldable mechanism according to claim 6, further comprising a half-round head screw, wherein the half-round head screw is mounted to the stem, a half-round head of the half-round head screw is spaced from the stem, and the second snapping groove is formed between the half-round head of the half-round head screw and the stem.

12. The handlebar foldable mechanism according to claim 1, further comprising a limiting elastic member, wherein a first end of the limiting elastic member is connected to the stem, and a second end of the limiting elastic member is configured to abut against the lever when the lever is pivoted to a preset position along a direction running away from the stem.

13. The handlebar foldable mechanism according to claim 1, further comprising a lower connector, wherein the lower connector is fixed to a lower end of the stem, the stem is pivotably connected to the base by the lower connector, and the stem is pivotably connected to the first locking assembly by the lower connector.

14. A tool for riding instead of walk, comprising a handlebar foldable mechanism, the handlebar foldable mechanism comprising:
a base provided with a first snapping groove;
a stem connected to the base and pivotable between an unfolded position and a folded position;
a first locking assembly pivotably connected to the stem and configured to be engaged with the first snapping groove when the stem is pivoted from the folded position to the unfolded position;
a lever pivotably connected with the base by a first pivot; and
a second locking assembly mounted to the lever, and configured to be connected to at least one of the base and the stem when the stem is at the unfolded position,
wherein the first locking assembly comprises a tensioning rod and a first snap, the first snap is connected to the tensioning rod, and the tensioning rod is pivotably connected to the lever,
wherein the first snap is pivotably connected to the stem by a second pivot.

15. The tool for riding instead of walk according to claim 14, wherein the tensioning rod is provided with a cam cavity, a cam is arranged to a first end of the lever, the cam is pivotably connected to the base by the first pivot and arranged eccentrically relative to a central axis of the first pivot, and the cam is fitted in the cam cavity.

16. The tool for riding instead of walk according to claim 14, wherein the first locking assembly further comprises a threaded sleeve and a first bolt, an end of the tensioning rod is provided with external threads, the end of the tensioning rod is threadedly fitted in the threaded sleeve, the first snap is provided with a snap through hole, and the first bolt passes through the snap through hole to be threadedly fitted with the threaded sleeve.

17. The tool for riding instead of walk according to claim 16, wherein the first locking assembly further comprises a first spring, a step is arranged in the snap through hole, the first spring is arranged in the snap through hole, a first end of the first spring abuts against the first bolt, and a second end of the first spring abuts against the step.

18. The tool for riding instead of walk according to claim 14, wherein the tool for riding instead of walk is a scooter.

* * * * *